US012212924B2

(12) United States Patent
Yu et al.

(10) Patent No.: US 12,212,924 B2
(45) Date of Patent: Jan. 28, 2025

(54) SPEAKER CORE, SPEAKER, AND ELECTRONIC DEVICE

(71) Applicant: Huawei Technologies Co., Ltd., Shenzhen (CN)

(72) Inventors: Ligang Yu, Shenzhen (CN); Guimin Wu, Shenzhen (CN); Jinhua Liu, Shenzhen (CN); Wei Liu, Shenzhen (CN); Chien Feng Yeh, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 199 days.

(21) Appl. No.: 17/919,653

(22) PCT Filed: Mar. 23, 2021

(86) PCT No.: PCT/CN2021/082245
§ 371 (c)(1),
(2) Date: Oct. 18, 2022

(87) PCT Pub. No.: WO2021/208676
PCT Pub. Date: Oct. 21, 2021

(65) Prior Publication Data

US 2023/0199402 A1 Jun. 22, 2023

(30) Foreign Application Priority Data

Apr. 18, 2020 (CN) ......................... 202010308645.7
Sep. 30, 2020 (CN) ......................... 202011063259.2

(51) Int. Cl.
*H04R 11/02* (2006.01)
*H04R 7/02* (2006.01)

(52) U.S. Cl.
CPC ............... *H04R 11/02* (2013.01); *H04R 7/02* (2013.01); *H04R 2400/11* (2013.01)

(58) Field of Classification Search
CPC ...... H04R 11/02; H04R 7/02; H04R 2400/11; H04R 2207/021; H04R 7/22; H04R 7/04; H04R 9/06
See application file for complete search history.

(56) References Cited

U.S. PATENT DOCUMENTS

2019/0014418 A1* 1/2019 Bing ........................ H04R 9/06
2020/0045445 A1* 2/2020 Feng ........................ H04R 9/06
2021/0368272 A1 11/2021 Wang

FOREIGN PATENT DOCUMENTS

| | | | |
|---|---|---|---|
| CN | 205491122 | U | 8/2016 |
| CN | 205545907 | U | 8/2016 |
| CN | 205754831 | U | 11/2016 |
| CN | 206061116 | U | 3/2017 |
| CN | 108632728 | A | 10/2018 |
| CN | 110191401 | A | 8/2019 |
| CN | 110191403 | A | 8/2019 |
| CN | 209283485 | U | 8/2019 |
| CN | 209676451 | U | 11/2019 |
| CN | 209861160 | U | 12/2019 |
| CN | 214154819 | U | 9/2021 |
| WO | 2020024669 | A1 | 2/2020 |

* cited by examiner

*Primary Examiner* — Tuan D Nguyen
(74) *Attorney, Agent, or Firm* — Conley Rose, P.C.

(57) ABSTRACT

A speaker core, speaker, and associated electronic device include at least one bent portion of a diaphragm folded ring suspended over a top of a diaphragm frame enclosing an enlarged vibration space.

20 Claims, 7 Drawing Sheets

SPEAKER CORE, SPEAKER, AND ELECTRONIC DEVICE

CROSS-REFERENCE TO RELATED APPLICATIONS

This application is a national stage of International Application No. PCT/CN2021/082245, filed on Mar. 23, 2021, which claims priority to Chinese Patent Application No. 202010308645.7 filed on Apr. 18, 2020, and claims priority to Chinese Patent application Ser. No. 202011063259.2 filed on Sep. 30, 2020. All of the aforementioned applications are hereby incorporated by reference in their entireties.

TECHNICAL FIELD

Embodiments of this application relate to the field of terminal device technologies, and in particular, to a speaker core, a speaker, and an electronic device.

BACKGROUND

Currently, audio play performance of an electronic device such as a smartphone attracts extensive attention, and a speaker is a core device for implementing an audio play function. In recent years, a high-performance speaker is continuously introduced in the industry. Particularly, a large-amplitude technology is used to improve low-frequency performance. In addition to increasing an amplitude, increasing a vibration area is also an important way to improve the low-frequency performance of the speaker.

A speaker core includes components such as a basin frame, a diaphragm, a voice coil, and a magnetic circuit. This application does not relate to a voice coil part or a magnetic circuit part, and therefore the voice coil part and the magnetic circuit part are not explained in the text and the accompanying drawings. The diaphragm includes a diaphragm mass and a diaphragm folded ring disposed on an outer edge of the diaphragm mass. The diaphragm mass is located in a central region at a top of the basin frame, and the diaphragm folded ring is located between a sidewall of the basin frame and the diaphragm mass. In a conventional technology, an area of the diaphragm mass is increased to increase a vibration area of the speaker core.

However, when a size of the speaker core remains unchanged, a width of an arc-shaped portion of the diaphragm folded ring is reduced in the method for increasing a vibration area of the speaker. Under a condition of large-amplitude application, if a narrow diaphragm folded ring is designed, nonlinearity of a suspension system of the speaker core is increased, which severely inhibits large-amplitude application.

SUMMARY

Embodiments of this application provide a speaker core, a speaker, and an electronic device, to resolve a problem that a nonlinear problem between driving force of the speaker and an amplitude of a diaphragm is aggravated in a conventional method for increasing a vibration area of the speaker, and consequently increase of an amplitude of the speaker is severely inhibited.

An embodiment of this application provides a speaker core, including a basin frame and a diaphragm.

There is a diaphragm frame of a ring-shaped structure at a top of the basin frame, an inner sidewall of the diaphragm frame encloses vibration space, and the diaphragm covers a top of the diaphragm frame.

The diaphragm includes a diaphragm mass and a diaphragm folded ring. The diaphragm mass is located in a central region of a top opening of the vibration space. The diaphragm folded ring is disposed around an outer edge of the diaphragm mass, and one end of the diaphragm folded ring is connected to an outer sidewall of the diaphragm frame.

The diaphragm folded ring includes an arc-shaped portion, and the arc-shaped portion includes a plurality of bent parts. The plurality of bent parts are circumferentially disposed in a radial direction of the diaphragm, and two adjacent bent parts are bent in different directions.

At least one bent part is suspended above the top of the diaphragm frame.

In this embodiment of this application, space above the top of the diaphragm frame of the basin frame is fully used, so that at least one bent part of the diaphragm folded ring is moved above the top of the diaphragm frame and suspended above the diaphragm frame. In this way, a part of the diaphragm folded ring is moved above the top of the diaphragm frame, and therefore the part of the diaphragm folded ring does not occupy a region above the vibration space enclosed by the inner sidewall of the diaphragm frame, and saved space can be used by the diaphragm mass. Therefore, in the speaker core provided in this embodiment of this application, when a width of the arc-shaped portion of the diaphragm folded ring is ensured, a horizontal size of the diaphragm mass located on an inner edge of the diaphragm folded ring is increased, and an effective vibration area is increased, to increase a sound pressure level of a speaker in a full frequency band range. In addition, a case in which a nonlinear problem between driving force of the speaker and an amplitude of the diaphragm is aggravated due to an excessively small width of the arc-shaped portion of the diaphragm folded ring is avoided, to ensure that increase of an amplitude of the speaker is not inhibited.

In a feasible implementation, a part that is of the arc-shaped portion and that is located above the diaphragm frame is bent in a direction far away from the diaphragm frame.

In this embodiment of this application, the arc-shaped portion located above the diaphragm frame is bent in the direction far away from the diaphragm frame, to prevent the arc-shaped portion above the diaphragm frame from colliding with the diaphragm frame in a process of vibrating up and down, so as to ensure that the amplitude of the diaphragm is not interfered with by the diaphragm frame.

In this embodiment of this application, the arc-shaped portion is disposed to include the plurality of bent parts, and it is set that two adjacent bent parts are bent in different directions. In this way, when it is ensured that there is a specific overall width of the arc-shaped portion, an arc length of the arc-shaped portion is increased, so that in a large-amplitude vibration process of the diaphragm mass, the arc-shaped portion of the diaphragm folded ring is not pulled by the diaphragm mass in a radial direction, to improve reliability of the diaphragm folded ring in a large-amplitude application scenario.

In a feasible implementation, the arc-shaped portion of the diaphragm folded ring includes a first bent part and a second bent part that are sequentially and circumferentially disposed in the radial direction of the diaphragm, and the second bent part is located between the first bent part and the diaphragm mass.

The first bent part is bent in a direction far away from the diaphragm frame, and the second bent part is bent towards an inner cavity of the vibration space.

The first bent part is suspended above the top of the diaphragm frame.

In this embodiment of this application, the arc-shaped portion is disposed to include the first bent part and the second bent part, and at least a part of the first bent part is disposed above the diaphragm frame, to dispose the arc-shaped portion by using thickness space of the diaphragm frame. In this way, when an area of the diaphragm mass is increased, a width size of the arc-shaped portion of the diaphragm folded ring is ensured. In addition, the first bent part is bent in the direction far away from the diaphragm frame, and the second bent part is bent towards the inner cavity of the vibration space. In this way, the first bent part is prevented from colliding with the diaphragm frame in a process of vibrating up and down, and an arc length of the arc-shaped portion is increased, to improve reliability of the diaphragm folded ring in a large-amplitude application scenario.

In a feasible implementation, bending radians of the first bent part and the second bent part are equal, and widths of the first bent part and the second bent part are equal.

In this embodiment of this application, it is set that for the first bent part and the second bent part, the bending radians are equal and the widths are equal. In this way, the first bent part and the second bent part of the arc-shaped portion form a central symmetric structure, so that the diaphragm folded ring forms a symmetric Kms curve, to reduce distortion of the speaker in this embodiment of this application.

In a feasible implementation, the diaphragm folded ring includes a first connecting portion and a second connecting portion, the first connecting portion and the second connecting portion are respectively connected to an outer edge and an inner edge of the arc-shaped portion, the first connecting portion is connected to the outer sidewall of the diaphragm frame, and the second connecting portion is connected to a surface of the diaphragm mass.

In this embodiment of this application, the first connecting portion that is of the diaphragm folded ring and that is located on the outer edge of the arc-shaped portion is connected to the outer sidewall of the diaphragm frame, and the second connecting portion located on the inner edge of the arc-shaped portion is connected to the diaphragm mass. In this way, connection strength between the diaphragm folded ring and each of the basin frame and the diaphragm mass is improved, to improve structural stability of the diaphragm folded ring at the top of the basin frame, and stability of the diaphragm mass at the top opening of the vibration space is correspondingly improved, to ensure stable vibration of the diaphragm at the top of the basin frame.

In a feasible implementation, the first connecting portion is bonded to the outer sidewall of the diaphragm frame, and the second connecting portion is bonded to the surface of the diaphragm mass.

In this embodiment of this application, the first connecting portion and the second connecting portion are respectively connected to the diaphragm frame and the diaphragm mass through bonding. In this way, connection strength between the first connecting portion and the diaphragm frame and connection strength between the second bent part and the diaphragm mass are ensured, and a connection structure between the diaphragm folded ring and each of the diaphragm frame and the diaphragm mass is simplified, to improve manufacturing efficiency of the speaker core.

In a feasible implementation, a buckle is disposed on a surface that is of the first connecting portion and that faces the outer sidewall of the diaphragm frame, a clamping groove that matches the buckle is formed on the outer sidewall of the diaphragm frame, and the buckle is clamped in the clamping groove.

In this embodiment of this application, the first connecting portion is connected to the outer sidewall of the diaphragm frame by using the buckle, to limit movement of the first connecting portion in a height direction of the diaphragm frame, so as to further improve structural stability of the first connecting portion on the diaphragm frame. In addition, the buckle on the first connecting portion is clamped in the clamping groove of the diaphragm frame, to increase a connection area between the first connecting portion and the diaphragm frame, so as to further improve connection strength between the first connecting portion and the outer sidewall of the diaphragm frame.

In a feasible implementation, the buckle includes a large end and a small end in an extension direction, and the small end is connected to the first connecting portion.

In this embodiment of this application, the buckle is disposed to include the large end and the small end, the small end is disposed on the first connecting portion, and the large end is far away from the first connecting portion and in contact with an inner bottom wall of the clamping groove. In this way, the buckle limits the movement of the first connecting portion in the height direction of the diaphragm frame, and difficulty of going out of the clamping groove by the buckle is increased, in other words, it is ensured that it is not easy for the buckle to go out of the clamping groove, to improve connection stability between the first connecting portion and the diaphragm frame.

In a feasible implementation, there is a limiting portion on the diaphragm frame, and the limiting portion is configured to fit with a protruding portion on an inner wall of a box of the speaker, to limit a height of the speaker core in the box.

In this embodiment of this application, the limiting portion is disposed on the diaphragm frame, so that the limiting portion fits with the inner wall of the box of the speaker, to limit the height of the speaker core in the box, so as to ensure that the diaphragm on the speaker core can vibrate up and down in a height direction of the box. In addition, the limiting portion is disposed, to implement quick positioning for assembly of the speaker core into the box. For example, when the speaker core is moved from a bottom of the box to an inner cavity of the box, the speaker core can be quickly positioned in the inner cavity of the box provided that the limiting portion on the speaker core fits with the protruding portion on the inner wall of the box, to improve efficiency of assembling the speaker core into the box.

In a feasible implementation, at least a part of a top surface of the diaphragm frame is configured as the limiting portion, and the limiting portion is abutted on a side that is of the protruding portion and that faces the bottom of the box.

In this embodiment of this application, a part of the top surface of the diaphragm frame is used as the limiting portion, to ensure that when the speaker core in this embodiment of this application is stably limited to a specific height in the box of the speaker, a structural setting of the speaker core is simplified, so as to improve the manufacturing efficiency of the speaker core. In addition, the limiting portion is abutted on the side that is of the protruding portion and that faces the inside of the box, to simplify a fitting structure between the limiting portion and the protruding portion, so as to improve efficiency of positioning the speaker core in the box.

In a feasible implementation, a cross section of the basin frame is of a quadrilateral structure, there are four corners at the top of the basin frame, and a part of a top surface of each corner is configured as the limiting portion.

In this embodiment of this application, the cross section of the basin frame is disposed as a quadrilateral structure, and top surfaces of four corners of the quadrilateral structure are used as limiting portions. In this way, it is ensured that the speaker core is stably assembled at a preset height in the box of the speaker, and a quantity of limiting portions is increased in the four-corner structure, so that the four corners of the basin frame can be simultaneously abutted on the protruding portion in the box, to further improve stability of the basin frame of the speaker core on a side of the protruding portion.

In a feasible implementation, a part that is of the diaphragm folded ring and that is located on the limiting portion is configured as a plane, and the plane is in contact with a surface of the limiting portion.

In actual application, a bottom surface of the protruding portion in the box of the speaker is of a planar structure. In this embodiment of this application, the part that is of the diaphragm folded ring and that is located on the limiting portion is configured as a plane. In this way, fitting between the limiting portion on the speaker core and the protruding portion is abutment between planes, to increase a contact area between the speaker core and the protruding portion, so that the limiting portion and the diaphragm folded ring located on the limiting portion are stably abutted on the bottom surface of the protruding portion, to improve stability of the speaker core in the box. In addition, the diaphragm folded ring located on the limiting portion is disposed as a plane. In this way, the diaphragm folded ring can be in close contact with the limiting portion, to improve stability of the diaphragm folded ring on the limiting portion.

In a feasible implementation, the width of the arc-shaped portion of the diaphragm folded ring is greater than or equal to 0.5 mm and less than or equal to 2 mm, to avoid a nonlinear problem of the speaker, so as to increase a maximum value of the amplitude of the speaker.

An embodiment of this application further provides a speaker, including a box and the foregoing speaker core.

The speaker core is mounted in core space of the box.

In this embodiment of this application, the speaker core is disposed in the box of the speaker, and at least a part of an arc-shaped portion of a diaphragm folded ring is disposed above a sidewall of vibration space, so that the arc-shaped portion of the diaphragm folded ring fully uses thickness space of a diaphragm frame of a basin frame. In this way, when a width of the arc-shaped portion of the diaphragm folded ring is ensured, a radial size of a diaphragm mass located on an inner edge of the diaphragm folded ring can be increased. Therefore, an effective vibration area is increased, to increase a sound pressure level of the speaker in a full frequency band range. In addition, a case in which a nonlinear problem between driving force of the speaker and an amplitude of a diaphragm is aggravated due to an excessively small width of the arc-shaped portion of the diaphragm folded ring is avoided, to ensure that increase of an amplitude of the speaker is not inhibited and to increase a maximum value of the amplitude of the speaker.

In a feasible implementation, a protruding portion extends on an inner sidewall of the box.

There is a limiting portion on a sidewall of the speaker core, and the limiting portion fits with the protruding portion, to limit a height of the speaker core in the box.

In this embodiment of this application, the limiting portion is disposed on the sidewall of the speaker core, so that the limiting portion fits with an inner wall of the box of the speaker, to limit the height of the speaker core in the box, so as to ensure that the diaphragm on the speaker core can vibrate up and down in a height direction of the box. In addition, the limiting portion is disposed, to implement quick positioning for assembly of the speaker core into the box. For example, when the speaker core is moved from a bottom of the box to the core space of the box, the speaker core can be quickly positioned in an inner cavity of the box provided that the limiting portion on the speaker core fits with the protruding portion on the inner wall of the box, to improve efficiency of assembling the speaker core into the box.

In a feasible implementation, the speaker further includes a sealing layer, and the sealing layer is disposed between an outer sidewall of the speaker core and the inner sidewall of the box.

In this embodiment of this application, the sealing layer is disposed between the outer sidewall of the speaker core and the inner sidewall of the box, to prevent a sound in the speaker from leaking from a bottom of the speaker, so as to ensure intensity of a sound propagated from a front of the speaker.

An embodiment of this application further provides an electronic device, including the foregoing speaker.

In this embodiment of this application, the speaker is disposed in the electronic device, to increase a sound pressure level of the speaker in a full frequency band range, and avoid a case in which a nonlinear problem between driving force of the speaker and an amplitude of a diaphragm is aggravated due to an excessively small width of an arc-shaped portion of a diaphragm folded ring in the speaker, so as to ensure that increase of an amplitude of the speaker is not inhibited and to increase a maximum value of the amplitude of the speaker.

DESCRIPTION OF REFERENCE NUMERALS

Figure 1:
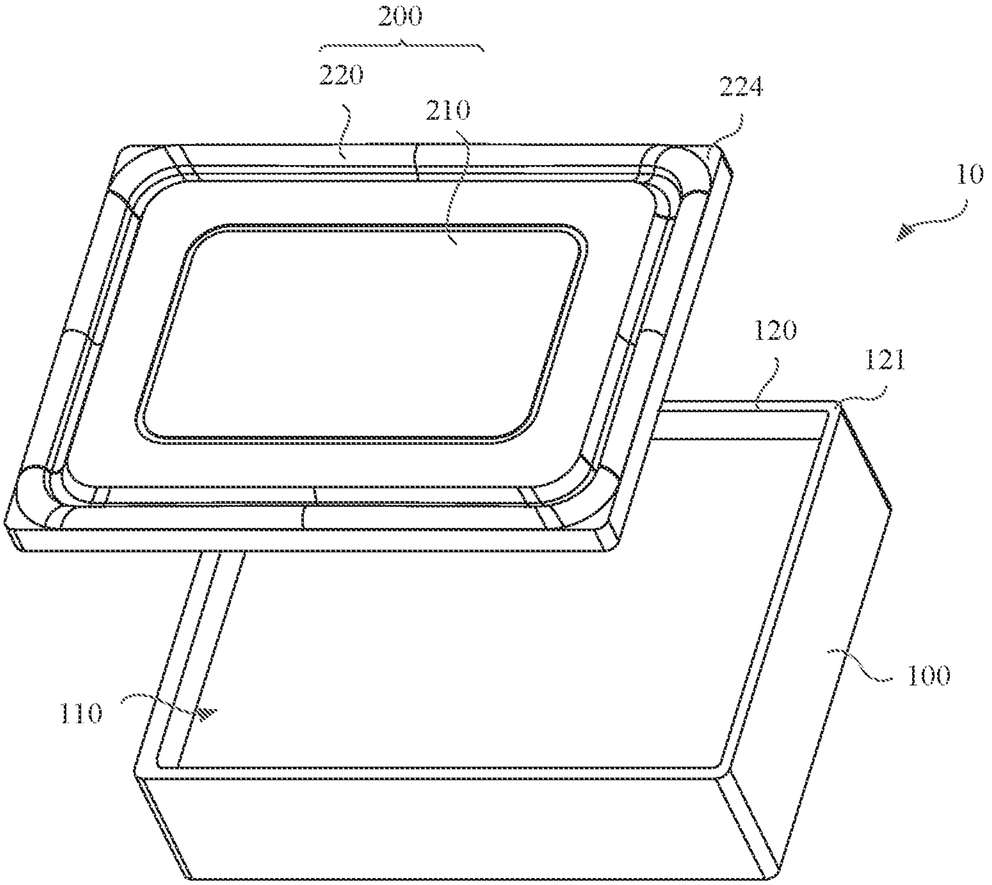
FIG. 1 is a schematic diagram of a structure of a speaker core according to an embodiment of this application.

10: Speaker core; 20: Speaker;

100: Basin frame; 200: Diaphragm; 300: Box; 400: Sealing layer;

110: Vibration space; 120: Diaphragm frame; 210: Diaphragm mass; 220: Diaphragm folded ring; 310: Core space; 320: Protruding portion;

121: Limiting portion; 221: Arc-shaped portion; 222: First connecting portion; 223: Second connecting portion; and

2211: First bent part; 2212: Second bent part; 2213: Third bent part; 2221: Buckle.

DESCRIPTION OF EMBODIMENTS

Terms used in implementations of this application are only used to explain specific embodiments of this application, but are not intended to limit this application.

It is well known that in addition to increasing an amplitude to improve low-frequency performance of a speaker, increasing a vibration area is also an important way to improve the low-frequency performance of the speaker.

A speaker core usually includes components such as a basin frame, a diaphragm, a voice coil, and a magnetic circuit. This application does not relate to a voice coil part or a magnetic circuit part, and therefore no related content is presented in the text or the accompanying drawings. There is a ring-shaped diaphragm frame at a top of the basin frame, and an edge of the diaphragm is bonded to the diaphragm frame. The diaphragm includes a diaphragm mass and a diaphragm folded ring connected to a periphery of the diaphragm mass. The diaphragm folded ring includes a bent arc-shaped part, and the arc-shaped part is configured to drive the diaphragm mass to vibrate in a height direction of the basin frame.

In a conventional technology, to increase a sound pressure level of the speaker, a size of the diaphragm mass in a horizontal direction is usually increased to increase a vibration area of the speaker. However, a horizontal size of the speaker core is limited. Especially when the speaker is a micro speaker and a horizontal size of the diaphragm mass is excessively large, a horizontal size of the diaphragm folded ring located at the periphery of the diaphragm mass is reduced, and consequently a horizontal size (namely, a width) of the arc-shaped part of the diaphragm folded ring is reduced.

However, when the arc-shaped part of the diaphragm folded ring has an excessively small width, a nonlinear problem between driving force of the speaker and an amplitude of the diaphragm is aggravated. Specifically, when the amplitude of the diaphragm of the speaker is large, a stiffness coefficient (Kms) of the diaphragm folded ring increases with the amplitude (displacement of the diaphragm in a vibration direction). Therefore, the driving force F (F=Kms.x, where x is the amplitude) required by the speaker at the large amplitude is increased. A power amplifier for driving the speaker has a limited output capability, in other words, the driving force F of the speaker is limited, and therefore increase of the amplitude is limited. A low-frequency signal has relatively low vibration frequency and a relatively large amplitude. When the amplitude of the diaphragm is greater than the amplitude of the low-frequency signal, the diaphragm can accurately restore the low-frequency signal. However, when the amplitude of the diaphragm is less than the amplitude of the low-frequency signal, the diaphragm of the speaker cannot accurately restore the amplitude of the low-frequency signal, and consequently the speaker cannot accurately restore a low-frequency sound. Therefore, when increase of the amplitude of the diaphragm is limited, some low-frequency signals cannot be accurately restored, which degrades the low-frequency performance of the speaker.

In a speaker core provided in embodiments of this application, a position of a diaphragm folded ring is changed. For example, in embodiments of this application, an arc-shaped portion of the diaphragm folded ring is disposed above a diaphragm frame, so that the arc-shaped portion of the diaphragm folded ring fully uses thickness space of the diaphragm frame. In this way, when a width of the arc-shaped portion of the diaphragm folded ring is ensured, an area of a diaphragm mass can be increased, to increase a sound pressure level of a speaker in a full frequency band range. In addition, when a vibration area is increased, a case in which a nonlinear problem is aggravated due to an excessively small width of the arc-shaped portion of the diaphragm folded ring is avoided.

Specific structures of the speaker core, a speaker, and an electronic device in embodiments of this application are described below in detail.

FIG. 1 is a schematic diagram of a structure of a speaker core according to an embodiment of this application. Refer to FIG. 1. An embodiment of this application provides a speaker core 10, including a basin frame 100 and a diaphragm 200. There is a diaphragm frame 120 at a top of the basin frame 100. The diaphragm frame 120 is of a ring-shaped structure, and the diaphragm frame 120 encloses vibration space 110 of the diaphragm 200.

The basin frame 100 may be integrally formed through injection molding. For example, a mounting groove may be disposed at the top of the basin frame 100, the mounting groove is used as the vibration space 110, and a ring-shaped groove wall around the mounting groove is used as the diaphragm frame 120.

For another example, the basin frame 100 may include a basin frame base and a diaphragm frame 120 disposed around a top of the basin frame base. The ring-shaped diaphragm frame 120 may be formed by welding a metal ribbon. The inside of the ring-shaped diaphragm frame 120 is vibration space 110. A manner of manufacturing the diaphragm frame 120 is not specifically limited in this embodiment of this application.

Figure 2:
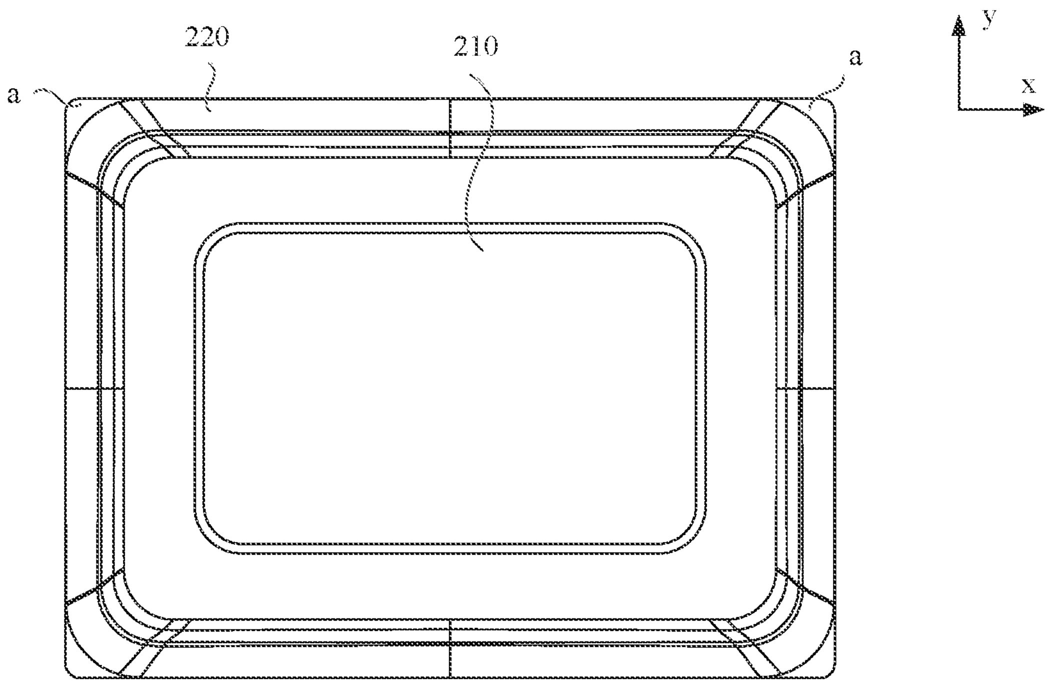
FIG. 2 is a top view of a structure of a speaker core according to an embodiment of this application.
Figure 3:
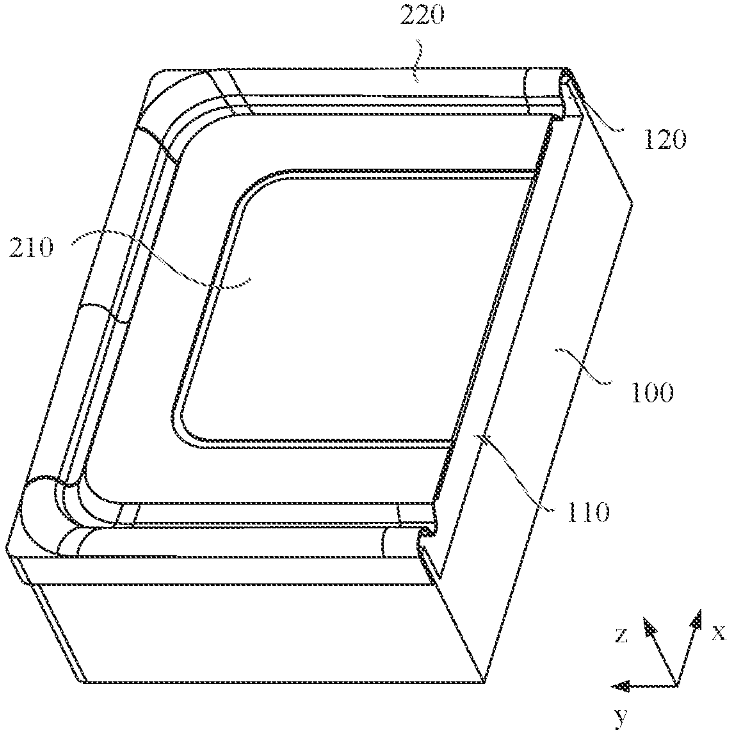
FIG. 3 is a schematic diagram of an internal structure of FIG. 2.

FIG. 2 is a top view of a structure of the speaker core according to an embodiment of this application, and FIG. 3 is a schematic diagram of an internal structure of FIG. 2. Refer to FIG. 1 to FIG. 3. The diaphragm 200 in this embodiment of this application covers the top of the basin frame 100. In this way, the diaphragm 200 is located on an opening part of the diaphragm frame 120, and may freely vibrate up and down in the inside, namely, the vibration space 110, and the outside of the diaphragm frame 120.

Figure 4:
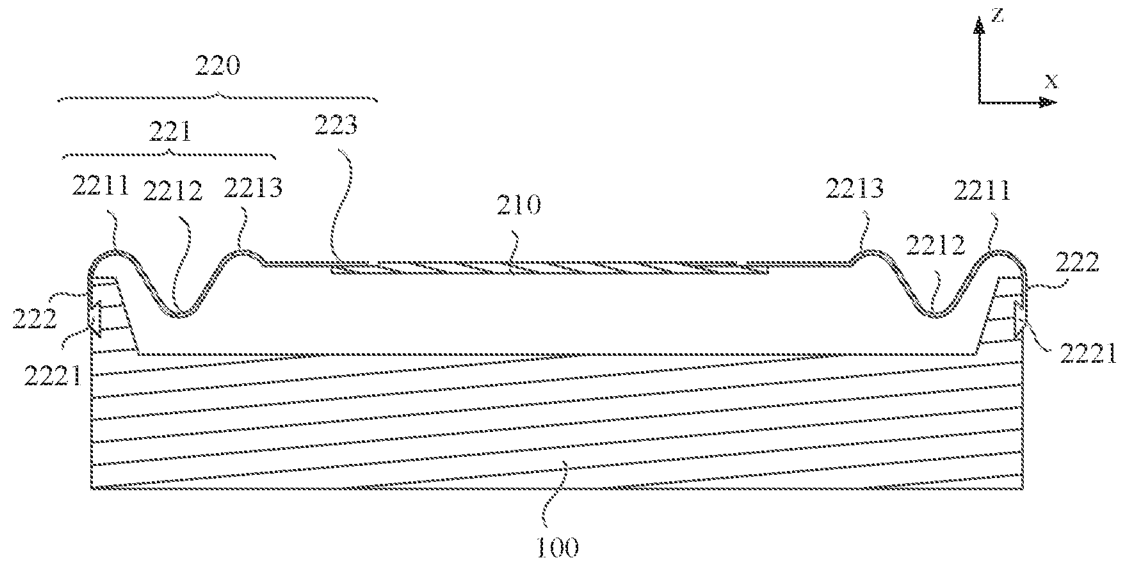
FIG. 4 is a cutaway drawing of FIG. 3.

FIG. 4 is a cutaway drawing of FIG. 3. Refer to FIG. 2 to FIG. 4. Specifically, the diaphragm 200 in this embodiment of this application includes a diaphragm mass 210 and a diaphragm folded ring 220. The diaphragm mass 210 is located in a central region of a top opening of the vibration space 110, and the diaphragm mass 210 may vibrate up and down in a height direction (namely, a z-axis direction in FIG. 4) of the basin frame 100 at the top opening of the vibration space 110. The diaphragm folded ring 220 is disposed around an outer edge of the diaphragm mass 210, that is, an inner edge of the diaphragm folded ring 220 is disposed on the outer edge of the diaphragm mass 210, and an outer edge of the diaphragm folded ring 220 is connected to an outer sidewall of the diaphragm frame 120.

The height direction of the basin frame 100 is a direction indicated by a z-axis in FIG. 4.

Refer to FIG. 4. In actual application, the diaphragm folded ring 220 includes an arc-shaped portion 221 disposed to be bent, and the arc-shaped portion 221 is disposed around the outer edge of the diaphragm mass 210. There may be an equal curvature radius at any position on a surface of the arc-shaped portion 221. For example, the arc-shaped portion 221 is of a circular arc structure.

In this embodiment of this application, the arc-shaped portion 221 of the diaphragm folded ring 220 vibrates, to drive the diaphragm mass 210 to vibrate up and down in the height direction of the basin frame 100, and prevent the diaphragm mass 210 from moving in a horizontal direction.

The horizontal direction of the basin frame 100 is a direction perpendicular to the height direction (the z-axis direction in FIG. 4) of the basin frame 100, for example, may be an x-axis direction in FIG. 3 or a y-axis direction in FIG. 3.

In this embodiment of this application, at least a part of the arc-shaped portion 221 of the diaphragm folded ring 220 is located above the diaphragm frame 120. For example, refer to FIG. 4. The arc-shaped portion 221 of the diaphragm folded ring 220 is partially located above the diaphragm frame 120. Alternatively, in some other examples, the arc-shaped portion 221 of the diaphragm folded ring 220 is completely located above the diaphragm frame 120. That the arc-shaped portion 221 is located above the diaphragm frame 120 means that the arc-shaped portion 221 is directly above a top end face of the diaphragm frame 120 in the z-axis direction in FIG. 4. When at least a part of the arc-shaped portion 221 is located above the diaphragm frame 120, the at least a part of the arc-shaped portion 221 is suspended above the diaphragm frame 120, that is, the at least a part of the arc-shaped portion 221 is not in contact with or does not touch a top of the diaphragm frame 120 during vibration.

When the arc-shaped portion 221 of the diaphragm folded ring 220 is completely located above the diaphragm frame 120, the arc-shaped portion 221 of the diaphragm folded ring 220 is completely moved above the diaphragm frame 120, in other words, the entire arc-shaped portion 221 is moved above the diaphragm frame 120. In this case, a horizontal size of the top opening of the vibration space 110 is not occupied. In this way, when the basin frame 100 has a specific horizontal size, the outer edge of the diaphragm mass 210 may be extended to an inner sidewall of the diaphragm frame 120. Therefore, an area of the diaphragm mass 210 is increased, and it is ensured that the arc-shaped portion 221 of the diaphragm folded ring 220 is not affected by a size, to avoid a case in which a nonlinear problem between driving force of a speaker and an amplitude of the diaphragm is aggravated due to an excessively small width of the arc-shaped portion 221 of the diaphragm folded ring 220.

Figure 5:
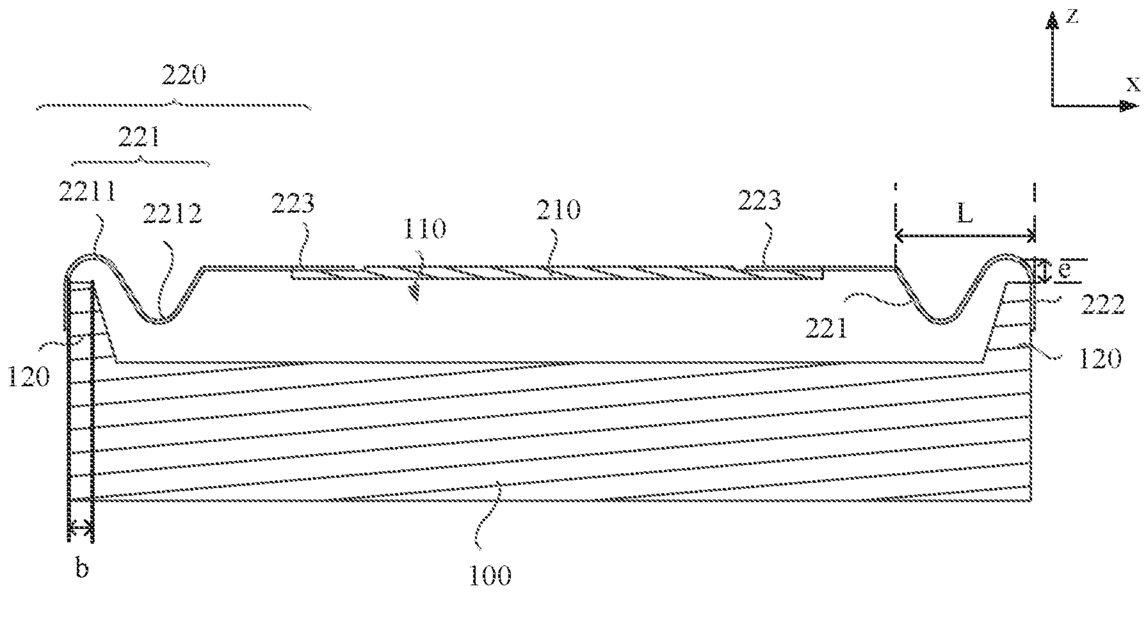
FIG. 5 is a cutaway drawing of another structure of a speaker core according to an embodiment of this application.

Refer to FIG. 5. It should be noted that when the arc-shaped portion 221 of the diaphragm folded ring 220 is partially located above the diaphragm frame 120, the width L of the arc-shaped portion 221 of the diaphragm folded ring 220 is greater than a thickness b of the diaphragm frame 120. When the arc-shaped portion 221 of the diaphragm folded ring 220 is completely located above the diaphragm frame 120, the width L (refer to FIG. 5) of the arc-shaped portion 221 of the diaphragm folded ring 220 is less than or equal to a thickness b of the diaphragm frame 120, to ensure that the entire arc-shaped portion 221 is located above the diaphragm frame 120.

The thickness b of the diaphragm frame 120 is specifically a thickness of the top (namely, an end that is of the diaphragm frame 120 and that is far away from the basin frame 100 in the z-axis direction in FIG. 5) of the diaphragm frame 120.

In this embodiment of this application, the width L of the arc-shaped portion 221 of the diaphragm folded ring 220 is greater than or equal to 0.5 mm and less than or equal to 2 mm. For example, the width L of the arc-shaped portion 221 may be a proper value such as 0.5 mm, 0.7 mm, 1 mm, 1.5 mm, or 2 mm. In this way, it may be ensured that the arc-shaped portion 221 of the diaphragm folded ring 220 does not have an excessively small width L, to avoid a case, for the speaker core 10, in which the nonlinear problem between the driving force of the speaker and the amplitude of the diaphragm is aggravated due to an excessively small width of the arc-shaped portion 221 of the diaphragm folded ring 220. Therefore, in this embodiment of this application, the width L of the arc-shaped portion 221 of the diaphragm folded ring 220 is greater than or equal to 0.5 mm and less than or equal to 2 mm, to increase a maximum value of an amplitude of the speaker 20.

Refer to FIG. 5. The width L of the arc-shaped portion 221 refers to a distance between an end that is of the arc-shaped portion 221 and that is close to the diaphragm mass 210 and an end that is far away from the diaphragm mass 210.

In this embodiment of this application, when the arc-shaped portion 221 of the diaphragm folded ring 220 is partially located above the diaphragm frame 120, for example, refer to FIG. 5, when ⅓L of the arc-shaped portion 221 of the diaphragm folded ring 220 may be disposed above the diaphragm frame 120, the outer edge of the diaphragm mass 210 may be extended by ⅓L in a direction of the diaphragm frame 120. In this way, when it is ensured that a width size of the arc-shaped portion 221 is not reduced, the area of the diaphragm mass 210 is increased, and when the area of the diaphragm mass 210 is increased, a vibration area of the speaker is increased, to increase a sound pressure level of the speaker.

In some examples, when the arc-shaped portion 221 of the diaphragm folded ring 220 is partially located above the diaphragm frame 120, an orthographic projection of the arc-shaped portion 221 of the diaphragm folded ring 220 on the diaphragm frame 120 may completely cover the top end face of the diaphragm frame 120. For example, refer to FIG. 5. When the arc-shaped portion 221 is projected in a negative direction of the z-axis, a part of the projection completely covers the top end face of the diaphragm frame 120, a part of the projection is located on the inner sidewall of the diaphragm frame 120, and a part of the projection is located on a part of the top opening of the vibration space 110.

In another example, when the arc-shaped portion 221 of the diaphragm folded ring 220 is completely located above the diaphragm frame 120, an orthographic projection of the arc-shaped portion 221 of the diaphragm folded ring 220 on the diaphragm frame 120 may partially or completely cover a top face of the diaphragm frame 120.

In this embodiment of this application, at least a part of the arc-shaped portion 221 of the diaphragm folded ring 220 is disposed above the diaphragm frame 120, so that the arc-shaped portion 221 of the diaphragm folded ring 220 fully uses thickness space of the diaphragm frame 120 of the basin frame 100. In this way, when the width of the arc-shaped portion 221 of the diaphragm folded ring 220 is ensured, a horizontal size of the diaphragm mass 210 located on the inner edge of the diaphragm folded ring 220 can be increased. Therefore, an effective vibration area is increased, to increase a sound pressure level of the speaker 20 in a full frequency band range. In addition, the nonlinear problem between the driving force of the speaker and the amplitude of the diaphragm is aggravated due to an excessively small width of the arc-shaped portion 221 of the diaphragm folded ring 220 is avoided, to ensure that increase of the amplitude of the speaker 20 is not inhibited.

It may be learned from a simulation experiment that for the speaker core 10 in this embodiment of this application, the vibration area is increased, to increase the sound pressure level in the full frequency band range. A speaker 20 with a size of 12 mm*16 mm is used as an example. For the speaker core 10 in this embodiment of this application, the vibration area of the speaker core 10 can be increased by 11%, and the corresponding sound pressure level in the full frequency band range is increased by 0.9 dB.

Refer to FIG. 5. During specific implementation of this embodiment of this application, the part that is of the arc-shaped portion 221 and that is located above the diaphragm frame 120 may be bent in a direction far away from the diaphragm frame 120.

In this way, the arc-shaped portion 221 above the diaphragm frame 120 can be prevented from colliding with the diaphragm frame 120 in a process of vibrating up and down, to ensure that the amplitude of the diaphragm 200 is not interfered with by the diaphragm frame 120.

In addition, the part that is of the arc-shaped portion 221 and that is located above the diaphragm frame 120 is bent in the direction far away from the diaphragm frame 120, to facilitate assembly between the diaphragm folded ring 220 and the basin frame 100.

Refer to FIG. 5. In some examples, when at least a part of the arc-shaped portion 221 is suspended above the diaphragm frame 120, a gap e between the part that is of the arc-shaped portion 221 and that is located above the diaphragm frame 120 and the top surface of the diaphragm frame 120 is greater than or equal to 0.3 mm, to facilitate assembly between the arc-shaped portion 221 and the basin frame 100. In addition, the gap is set in the foregoing range, to ensure that the arc-shaped portion 221 stably vibrates, and is not interfered with by the diaphragm frame 120.

It should be noted that the gap e is a maximum gap that is between the arc-shaped portion 221 and the top surface of the diaphragm frame 120 and that exists when the arc-shaped portion 221 is bent in the direction far away from the diaphragm frame 120. In addition, the gap e refers to a distance between a side that is of the arc-shaped portion 221 and that faces the top surface of the diaphragm frame 120 and the top surface of the diaphragm frame 120.

For example, the gap e between the part that is of the arc-shaped portion 221 and that is located above the diaphragm frame 120 and the top surface of the diaphragm frame 120 may be a proper value such as 0.3 mm, 0.4 mm, 0.5 mm, or 0.6 mm. It may be understood that the gap may be specifically adjusted based on a height of the speaker 20 and a performance requirement of the speaker 20.

In an implementation, the arc-shaped portion 221 of the diaphragm folded ring 220 may be bent once in a direction perpendicular to a z-axis direction in FIG. 3. For example, the entire arc-shaped portion 221 is of a circular arc structure bent in the direction far away from the diaphragm frame 120. In this way, a structure of the diaphragm folded ring 220 is simplified, to improve manufacturing efficiency of the speaker core 10.

In another implementation, the arc-shaped portion 221 of the diaphragm folded ring 220 may further include a plurality of bent parts, and the plurality of bent parts may be horizontally bent for a plurality of times in an x-axis direction in FIG. 5.

Two adjacent bent parts are bent in different directions. For example, a bent part is of a circular arc structure bent in the direction far away from the diaphragm frame 120, for example, the bent part may be an arc-shaped convex surface, and a bent part adjacent to the bent part is of a circular arc structure bent in a direction close to the diaphragm frame 120, for example, the another adjacent bent part may be an arc-shaped concave surface.

When the arc-shaped portion 221 includes a plurality of bent parts, at least one bent part may be suspended above the top of the diaphragm frame 120. For example, one bent part may be moved and suspended above the top of the diaphragm frame 120, or two bent parts may be moved and suspended above the top of the diaphragm frame 120.

In this embodiment of this application, the arc-shaped portion 221 is disposed to include the plurality of bent parts, and it is set that two adjacent bent parts are bent in different directions. In this way, when it is ensured that there is a specific overall width of the arc-shaped portion 221, an arc length of the arc-shaped portion 221 is increased, so that in a large-amplitude vibration process of the diaphragm mass 210, the arc-shaped portion 221 of the diaphragm folded ring 220 is not pulled by the diaphragm mass 210 in a radial direction, to improve reliability of the diaphragm folded ring 220 in a large-amplitude application scenario.

Still refer to FIG. 5. For example, the arc-shaped portion 221 of the diaphragm folded ring 220 includes a first bent part 2211 and a second bent part 2212 that are sequentially and circumferentially disposed. The second bent part 2212 is located between the first bent part 2211 and the diaphragm mass 210. That is, an inner edge of the second bent part 2212 of the arc-shaped portion 221 is connected to the outer edge of the diaphragm mass 210, and an outer edge of the second bent part 2212 is connected to an inner edge of the first bent part 2211.

The first bent part 2211 is suspended above the top of the diaphragm frame 120, to dispose the arc-shaped portion 221 by using the thickness space of the diaphragm frame 120. In this way, when the area of the diaphragm mass 210 is increased, the width size of the arc-shaped portion 221 of the diaphragm folded ring 220 is ensured.

It should be noted that when the first bent part 2211 is suspended above the top of the diaphragm frame 120, a region of the first bent part 2211 may be completely suspended above the top of the diaphragm frame 120, or a region of the first bent part 2211 may be partially suspended above the top of the diaphragm frame 120.

In addition, the first bent part 2211 is bent in the direction far away from the diaphragm frame 120, and the second bent part 2212 is bent towards the vibration space 110. In this way, the first bent part 2211 is prevented from colliding with the diaphragm frame 120 in a process of vibrating up and down, and the first bent part 2211 and the second bent part 2212 are bent in different directions, to increase the arc length of the arc-shaped portion 221, so as to improve reliability of the diaphragm folded ring 220 in a large-amplitude application scenario.

In specific disposing, bending radians of the first bent part 2211 and the second bent part 2212 may be equal, and widths of the first bent part 2211 and the second bent part 2212 are equal. In this way, the first bent part 2211 and the second bent part 2212 of the arc-shaped portion 221 form a central symmetric structure, so that when the diaphragm folded ring 220 vibrates, a Kms curve corresponding to the first bent part 2211 and a Kms curve corresponding to the second bent part 2212 are symmetric, to reduce distortion of the speaker 20, in other words, to avoid a case in which there is excessive distortion of the speaker 20 in this embodiment of this application.

For another example, the arc-shaped portion 221 of the diaphragm folded ring 220 may further include a third bent part 2213 (refer to FIG. 4) disposed between the second bent part 2212 and the diaphragm mass 210. In other words, the third bent part 2213 is disposed at an end (namely, the inner edge of the second bent part 2212) that is of the second bent part 2212 and that is far away from the first bent part 2211. The third bent part 2213 is bent in a direction opposite to a direction in which the second bent part 2212 is bent. For example, when the second bent part 2212 is bent towards the inside of the vibration space 110, the third bent part 2213 is bent towards the outside of the vibration space 110, to further increase the arc length of the arc-shaped portion 221, so as to improve reliability of the diaphragm folded ring 220 in a large-amplitude application scenario.

Refer to FIG. 5. In the speaker core 10 in this embodiment of this application, the diaphragm folded ring 220 may include a first connecting portion 222 and a second connecting portion 223. The first connecting portion 222 and the second connecting portion 223 are respectively connected to an outer edge and an inner edge of the arc-shaped portion 221. For example, the first connecting portion 222 is connected to the outer edge (an end far away from the diaphragm mass 210) of the arc-shaped portion 221, and the second connecting portion 223 is connected to the inner edge (an end close to the diaphragm mass 210) of the arc-shaped portion 221.

In specific assembly, the first connecting portion 222 of the diaphragm folded ring 220 may be connected to the outer sidewall of the diaphragm frame 120, and the second connecting portion 223 may be connected to a surface of the diaphragm mass 210. The second connecting portion 223 may be connected to an outer surface of the diaphragm mass 210, or the second connecting portion 223 may be connected to an inner surface of the diaphragm mass 210.

It should be noted that the outer surface of the diaphragm mass 210 is a surface that is of the diaphragm mass 210 and that faces the outside of the vibration space 110, and the inner surface of the diaphragm mass 210 is a surface that is of the diaphragm mass 210 and that faces the inside of the vibration space 110.

The first connecting portion 222 and the outer sidewall of the diaphragm frame 120, and the second connecting portion 223 and the diaphragm mass 210 may be connected through bonding by using an adhesive layer, through clamping or welding, or by using a fastener.

In this embodiment of this application, the first connecting portion 222 is connected to the outer sidewall of the diaphragm frame 120, and the second connecting portion 223 is connected to the diaphragm mass 210. In this way, connection strength between the diaphragm folded ring 220 and each of the basin frame 100 and the diaphragm mass 210 is improved, to improve structural stability of the diaphragm folded ring 220 at the top of the basin frame 100, and stability of the diaphragm mass 210 at the top opening of the vibration space 110 is correspondingly improved, to ensure stable vibration of the diaphragm 200 at the top of the basin frame 100.

In an optional implementation, the first connecting portion 222 is detachably connected to the outer sidewall of the diaphragm frame 120, and correspondingly, the second connecting portion 223 is detachably connected to the surface of the diaphragm mass 210. In this embodiment of this application, the detachable connection includes but is not limited to clamping, bonding, or a fastening connection established by using a fastener. For example, the first connecting portion 222 may be bonded to the outer sidewall of the diaphragm frame 120 by using an adhesive layer. Similarly, the second connecting portion 223 may be bonded to the surface of the diaphragm mass 210 by using an adhesive layer.

In this embodiment of this application, the first connecting portion 222 and the second connecting portion 223 are respectively connected to the diaphragm frame 120 and the diaphragm mass 210 through bonding. In this way, connection strength between the first connecting portion 222 and the diaphragm frame 120 and connection strength between the second bent part 2212 and the diaphragm mass 210 are ensured, and a connection structure between the diaphragm folded ring 220 and each of the diaphragm frame 120 and the diaphragm mass 210 is simplified, to improve manufacturing efficiency of the speaker core 10.

For another example, the first connecting portion 222 is connected to the outer sidewall of the diaphragm frame 120 through clamping. Specifically, a buckle 2221 (refer to FIG. 4) may be disposed on a surface that is of the first connecting portion 222 and that faces the outer sidewall of the diaphragm frame 120, and a clamping groove that matches the buckle 2221 is formed on the outer sidewall of the diaphragm frame 120. The buckle 2221 is clamped in the clamping groove.

In this embodiment of this application, the first connecting portion 222 is connected to the outer sidewall of the diaphragm frame 120 by using the buckle 2221, to limit movement of the first connecting portion 222 in a z-axis direction of the diaphragm frame 120, so as to further improve structural stability of the first connecting portion 222 on the diaphragm frame 120.

In addition, the buckle 2221 on the first connecting portion 222 is clamped in the clamping groove of the diaphragm frame 120, to increase a connection area between the first connecting portion 222 and the diaphragm frame 120, so as to further improve connection strength between the first connecting portion 222 and the outer sidewall of the diaphragm frame 120.

In specific implementation, the buckle 2221 in this embodiment of this application may include a large end and a small end. The small end is connected to the first connecting portion 222, and the large end is located in the clamping groove. For example, an outer contour size of the buckle 2221 gradually increases in a groove depth direction of the clamping groove. Correspondingly, a size of the clamping groove located on the outer sidewall of the diaphragm frame 120 matches the outer contour size of the buckle 2221, that is, the size of the clamping groove gradually increases from a groove opening to a groove bottom. For example, a cross section of the buckle 2221 is in a trapezoidal shape (refer to in FIG. 4).

In this embodiment of this application, the buckle 2221 is disposed to include the large end and the small end, the small end is disposed on the first connecting portion 222, and the large end is far away from the first connecting portion 222 and clamped in the clamping groove. In this case, a contact area between the buckle 2221 and an inner wall of the clamping groove gradually increases in a direction from the groove opening of the clamping groove to the groove bottom of the clamping groove. In this way, the buckle 2221 limits the movement of the first connecting portion 222 in the height direction of the diaphragm frame 120, and difficulty of going out of the clamping groove by the buckle 2221 is increased, in other words, it is ensured that it is not easy for the buckle 2221 to go out of the clamping groove, to improve connection stability between the first connecting portion 222 and the diaphragm frame 120.

It should be noted that the groove bottom of the clamping groove refers to a groove wall that is of the clamping groove and that faces the groove opening.

It should be noted that the small end of the buckle 2221 is specifically an end with a relatively small size in the buckle 2221, and the large end of the buckle 2221 is specifically an end with a relatively large size in the buckle 2221.

In some examples, a protrusion (not shown in the figure) may extend on a sidewall of the buckle 2221, and a groove matching the protrusion is formed on the groove wall of the clamping groove. The buckle 2221 is clamped in the clamping groove, and the protrusion is extended into the groove, so that the buckle 2221 is stably clamped in the clamping groove, to improve the connection stability between the first connecting portion 222 and the diaphragm frame 120.

In this embodiment of this application, when the second connecting portion 223 is connected to the diaphragm mass 210, the second connecting portion 223 may be clamped on the diaphragm mass 210. For example, a buckle 2221 may be disposed on a side that is of the second connecting portion 223 and that faces the outer surface of the diaphragm mass 210, a clamping groove matching the buckle 2221 is formed on the outer surface of the diaphragm mass 210, and the buckle 2221 is clamped in the clamping groove, to stably connect the second connecting portion 223 to the diaphragm mass 210.

In another optional implementation, the diaphragm folded ring 220, the basin frame 100, and the diaphragm mass 210 may be disposed as an integrally formed part. For example, the second connecting portion 223 of the diaphragm folded ring 220 and the diaphragm mass 210 are integrally formed through injection molding, and the first connecting portion 223 of the diaphragm folded ring 220 and the basin frame 100 are integrally formed through injection molding, to improve the connection strength between the diaphragm folded ring 220 and the basin frame 100 and between the diaphragm folded ring 220 and the diaphragm mass 210.

It may be understood that when the diaphragm folded ring 220 and the basin frame 100 are integrally formed as an integral part through injection molding, a clamping groove may be disposed on the outer sidewall of the diaphragm frame 120 of the basin frame 100, and a buckle 2221 is disposed on the first connecting portion 222 of the diaphragm folded ring 220. During injection molding, the buckle 2221 is extended into the clamping groove, to increase a contact area between the first connecting portion 222 and the diaphragm frame 120, so as to improve the connection stability between the first connecting portion 222 and the diaphragm frame 120.

For a manner of disposing the clamping groove and the buckle 2221, refer to the content indicating that the first connecting portion 222 is clamped on the diaphragm frame 120. Details are not described herein.

Figure 6:
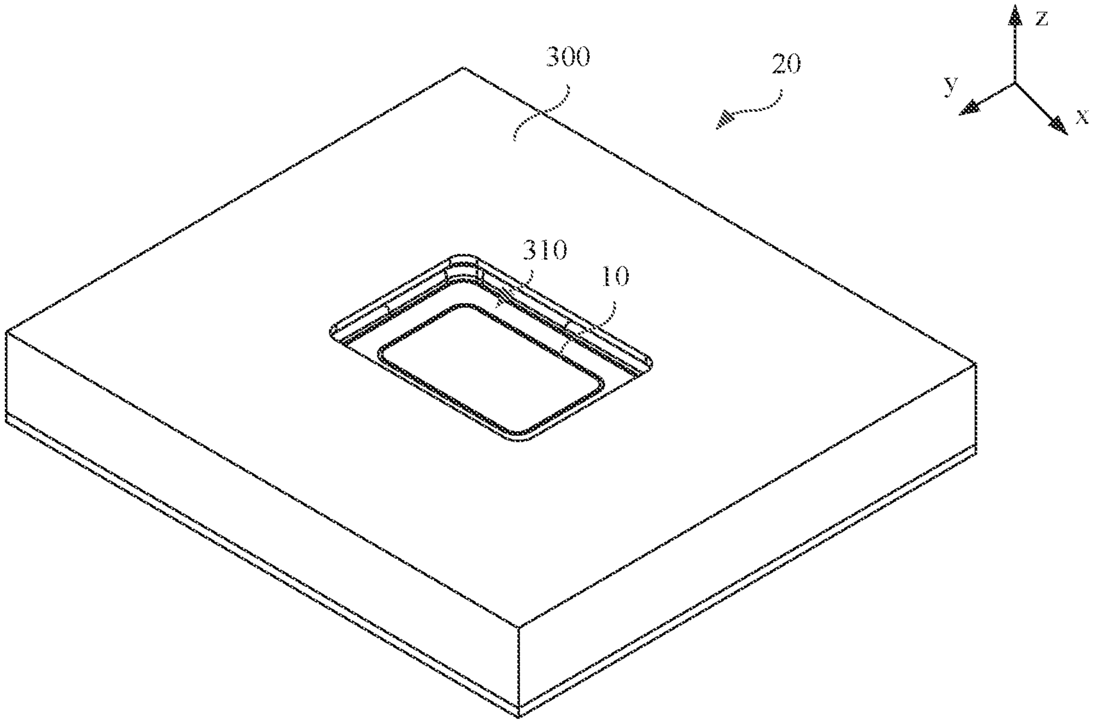
FIG. 6 is a schematic diagram of a structure of a speaker from a first angle of view according to an embodiment of this application.
Figure 7:
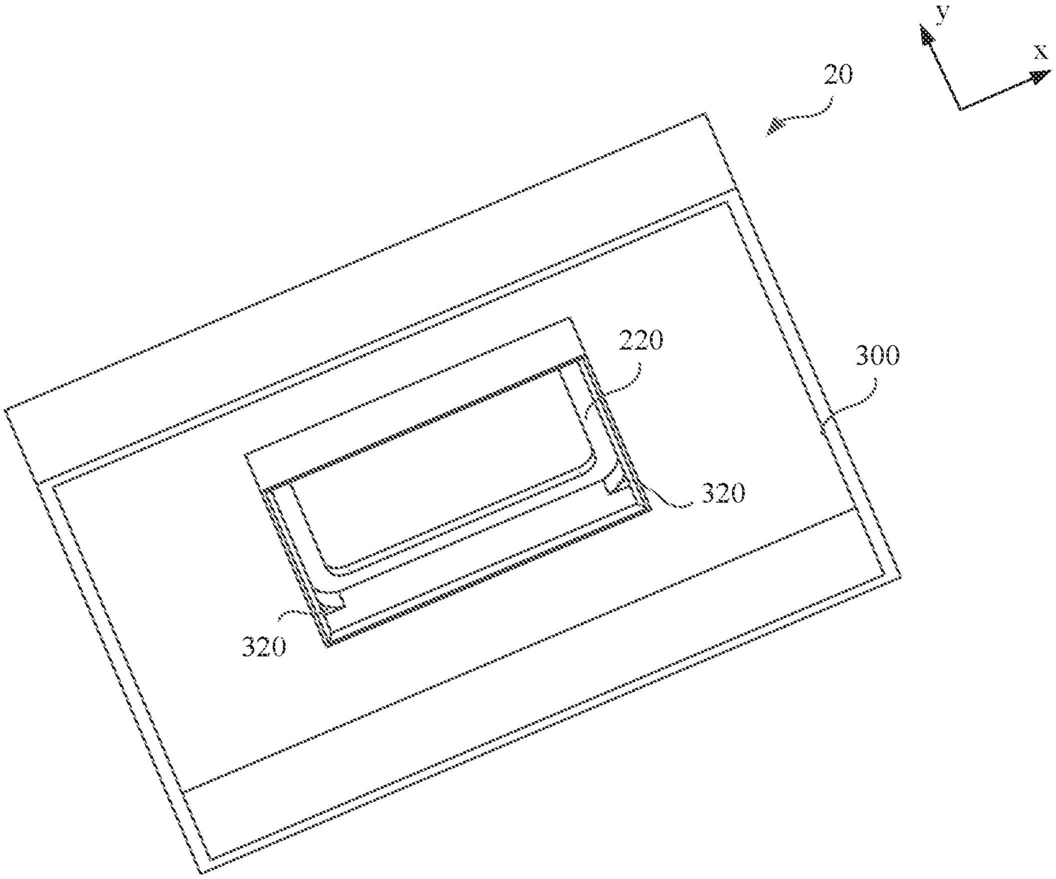
FIG. 7 is a schematic diagram of a structure of a speaker from a second angle of view according to an embodiment of this application.
Figure 8:
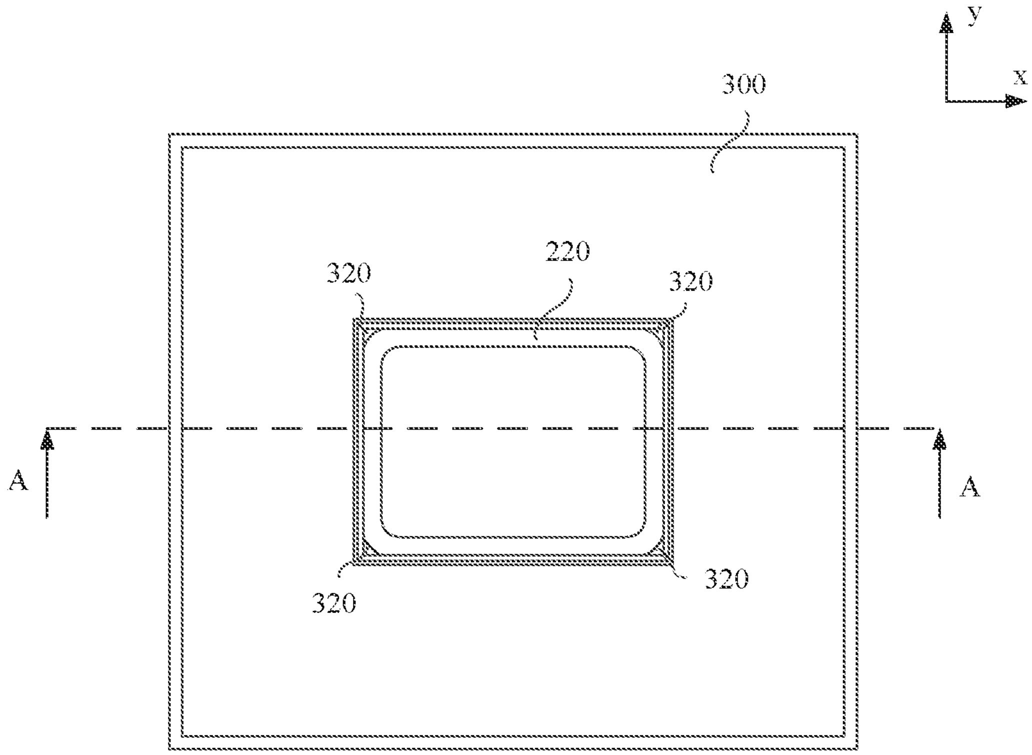
FIG. 8 is a top view of FIG. 6.

FIG. 6 is a schematic diagram of a structure of a speaker from a first angle of view according to an embodiment of this application, FIG. 7 is a schematic diagram of a structure of a speaker from a second angle of view according to an embodiment of this application, and FIG. 8 is a top view of FIG. 6. Refer to FIG. 6 to FIG. 8. In actual application, when the speaker core 10 is assembled into a box 300 of the speaker 20, it needs to be ensured that a height of the speaker core 10 in the box 300 is a preset height, to ensure a preset distance between an outer surface of the diaphragm 200 on the speaker core 10 and an inner top wall of the box 300. At this preset distance, the diaphragm 200 on the speaker core 10 can effectively vibrate, to propagate a sound with specific intensity and a specific tone from a top of the box 300 to the outside of the box 300.

Still refer to FIG. 7 and FIG. 8. In actual application, a protruding portion 320 extends on an inner wall of the box 300 of the speaker 20. Therefore, in this embodiment of this application, a limiting portion 121 (refer to FIG. 1) may be disposed on the diaphragm frame 120. When the speaker core 10 is mounted into the box 300 of the speaker 20, the limiting portion 121 is configured to fit with the protruding portion 320 on the inner wall of the box 300, to limit the height of the speaker core 10 in the box 300, in other words, limit a position of the speaker core 10 in a z-axis direction (refer to FIG. 6).

In this embodiment of this application, the limiting portion 121 is disposed on the diaphragm frame 120, so that the limiting portion 121 fits with the inner wall of the box 300 of the speaker 20, to limit the height of the speaker core 10 in the box 300, so as to ensure that the diaphragm 200 on the speaker core 10 can vibrate up and down in the height direction of the box 300.

In addition, the limiting portion 121 is disposed, to implement quick positioning for assembly of the speaker core 10 into the box 300. For example, when the speaker core 10 is moved from a bottom of the box 300 to an inner cavity of the box 300, the speaker core 10 can be quickly positioned in the inner cavity of the box 300 provided that the limiting portion 121 on the speaker core 10 fits with the protruding portion 320 on the inner wall of the box 300, and then the speaker core 10 is fastened to the inner wall of the box 300. In the entire process, efficiency of assembling the speaker core 10 into the box 300 is improved.

In specific disposing, a bump (not shown in the figure) may be disposed on the outer sidewall of the diaphragm frame 120, and the bump may be used as the limiting portion 121. When the speaker core 10 is assembled into the box 300, the bump fits with the protruding portion 320 in the box 300. For example, the bump may be abutted on a bottom of the protruding portion 320, to limit the height of the speaker core 10 in the box 300.

The bottom of the protruding portion 320 refers to a side that is of the protruding portion 320 and that faces the bottom of the box 300.

To improve a limiting effect, two or more bumps may be disposed at intervals on the outer sidewall of the diaphragm frame 120 in a circumferential direction. For example, when there are two bumps, the two bumps may be respectively symmetrically disposed on two sides of an axis of the basin frame 100, to ensure balance of force exerted on the speaker core 10 in the box 300. For another example, four bumps may be evenly disposed on the outer sidewall of the diaphragm frame 120 in the circumferential direction, to further improve stability of the speaker core 10 in the box 300.

In some examples, at least a part of the top surface of the diaphragm frame 120 may be configured as the limiting portion 121 (refer to FIG. 1). For example, a part of an outer edge of the diaphragm frame 120 may be used as the limiting portion 121, and when the speaker core 10 is assembled into the box 300, the limiting portion 121 is abutted on the side that is of the protruding portion 320 and that faces the bottom of the box 300.

In this embodiment of this application, a part of the top surface of the diaphragm frame 120 is used as the limiting portion 121, to ensure that when the speaker core 10 in this embodiment of this application is stably limited to a specific height in the box 300 of the speaker 20, a structural setting of the speaker core 10 is simplified, so as to improve the manufacturing efficiency of the speaker core 10.

In addition, the limiting portion 121 is abutted on the side that is of the protruding portion 320 and that faces the inside of the box 300, to simplify a fitting structure between the limiting portion 121 and the protruding portion 320, so as to improve efficiency of positioning the speaker core 10 in the box 300.

In actual application, a cross section of the basin frame 100 may be disposed as a quadrilateral structure (refer to FIG. 1). For example, the basin frame 100 may be of a cuboid structure. In this way, any cross section of the diaphragm frame 120 at a periphery of the vibration space 110 may be of a rectangular structure. There are four corners at the top of the basin frame 100, and a part of a top surface of each corner is configured as the limiting portion 121.

Based on the setting of the four limiting portions 121, there may be four protruding portions 320 in the box 300, and the four protruding portions 320 fit with the corresponding limiting portions 121. When the speaker core 10 is assembled into the box 300, all top surfaces of four corners of the diaphragm frame 120 are abutted on bottoms of the corresponding protruding portions 320, to limit the height of the speaker core 10 in the box 300.

In some other examples, the protruding portion 320 in the box 300 may alternatively be a ring-shaped protruding portion disposed around the inner wall of the box 300. In this case, top surfaces of the four corners of the basin frame 100 are respectively abutted on corresponding positions of the ring-shaped protruding portion 320.

In this embodiment of this application, the cross section of the basin frame 100 is disposed as a quadrilateral structure, and top surfaces of four corners of the quadrilateral structure are used as limiting portions 121. In this way, it is ensured that the speaker core 10 is stably assembled at the preset height in the box 300 of the speaker 20, and a quantity of limiting portions 121 is increased in the four-corner structure, so that the four corners of the basin frame 100 can be simultaneously abutted on the protruding portion 320 in the box 300, to further improve stability of the basin frame 100 of the speaker core 10 on a side of the protruding portion 320.

It may be understood that when the ring-shaped protruding portion 320 is disposed around the inner wall of the box 300, the four limiting portions 121 can be stably and accurately abutted on a bottom surface of the protruding portion 320. In this way, fitting efficiency and fitting stability between the four limiting portions 121 and the bottom surface of the protruding portion 320 are improved, and a case in which there is misalignment between the four limiting portions 121 and the protruding portion 320 in a horizontal direction is avoided.

In actual application, the bottom surface of the protruding portion 320 in the box 300 of the speaker 20 is of a planar structure, and the top surface that is of the corner of the diaphragm frame 120 and that is configured as the limiting portion 121 is also of a planar structure.

Based on this, in specific disposing, a part that is of the diaphragm folded ring 220 and that is located on the limiting portion 121 may be configured as a plane (as shown by a in FIG. 2), and the plane a is in contact with a surface of the limiting portion 121. For example, the diaphragm folded ring 220 located on the top surfaces of the four corners of the diaphragm frame 120 is also disposed as a plane a, and the plane a is in close contact with the top surfaces of the corners. In this way, fitting between the limiting portion 121 on the speaker core 10 and the protruding portion 320 is abutment between planes, to increase a contact area between the speaker core 10 and the protruding portion 320, so that the limiting portion 121 and the diaphragm folded ring 220 located on the limiting portion 121 are stably abutted on the bottom surface of the protruding portion 320, to improve stability of the speaker core 10 in the box 300.

In addition, the diaphragm folded ring 220 located on the limiting portion 121 is disposed as a plane. In this way, the diaphragm folded ring 220 can be in close contact with the limiting portion 121, to improve stability of the diaphragm folded ring 220 on the limiting portion 121 and improve a sealing effect of connection between the diaphragm 200 and the basin frame 100.

In another example, the diaphragm folded ring 220 located on the top surface of the corner may be of an arc-shaped structure or an irregular non-planar structure. This is not limited in this embodiment of this application.

Refer to FIG. 6. An embodiment of this application further provides a speaker 20, including a box 300 and a speaker core 10. The speaker core 10 is mounted in core space 310 of the box 300.

The speaker core 10 may be the speaker core 10 in any one of the foregoing examples. Details are not described herein one by one for a specific structure of the speaker core 10.

In this embodiment of this application, the speaker core 10 is disposed in the box 300 of the speaker 20, and at least a part of an arc-shaped portion 221 of a diaphragm folded ring 220 is disposed above a diaphragm frame 120, so that the arc-shaped portion 221 of the diaphragm folded ring 220 fully uses thickness space of the diaphragm frame 120 of a basin frame 100. In this way, when a width of the arc-shaped portion 221 of the diaphragm folded ring 220 is ensured, a radial size of a diaphragm mass 210 located on an inner edge of the diaphragm folded ring 220 can be increased. Therefore, an effective vibration area is increased, to increase a sound pressure level of the speaker 20 in a full frequency band range. In addition, a case in which a nonlinear problem is aggravated due to an excessively small width of the arc-shaped portion 221 of the diaphragm folded ring 220 is avoided, to ensure that increase of an amplitude of the speaker 20 is not inhibited and to increase a maximum value of the amplitude of the speaker 20.

Refer to FIG. 7 and FIG. 8. As described above, a protruding portion 320 extends on an inner wall of the box 300 in this embodiment of this application, and there is a limiting portion 121 on a sidewall of the speaker core 10. The limiting portion 121 fits with the protruding portion 320, to limit a height of the speaker core 10 in the box 300.

In this embodiment of this application, the limiting portion 121 is disposed on the sidewall of the speaker core 10, so that the limiting portion 121 fits with an inner wall of the box 300 of the speaker 20, to limit the height of the speaker core 10 in the box 300, so as to ensure that a diaphragm 200 on the speaker core 10 can vibrate up and down in a height direction of the box 300. In addition, the limiting portion 121 is disposed, to implement quick positioning for assembly of the speaker core 10 into the box 300. For example, when the speaker core 10 is moved from a bottom of the box 300 to an inner cavity of the box 300, the speaker core 10 can be quickly positioned in the inner cavity of the box 300 provided that the limiting portion 121 on the speaker core 10 fits with the protruding portion 320 on the inner wall of the box 300, to improve efficiency of assembling the speaker core 10 into the box 300.

For a manner of specifically disposing the limiting portion 121, directly refer to the foregoing related content. Details are not described herein.

Figure 9:
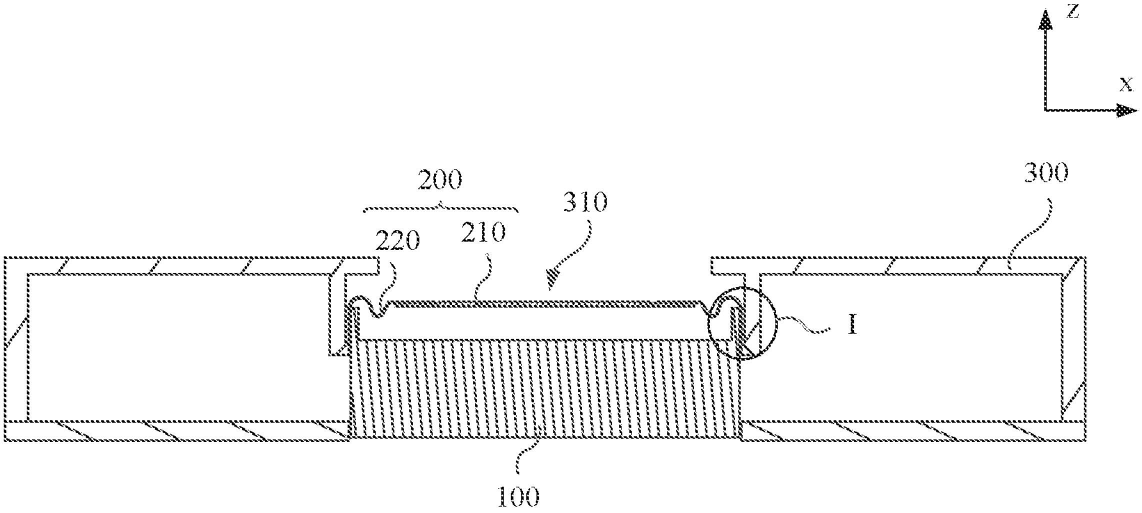
FIG. 9 is a cutaway drawing of FIG. 8 along a line A-A.
Figure 10:
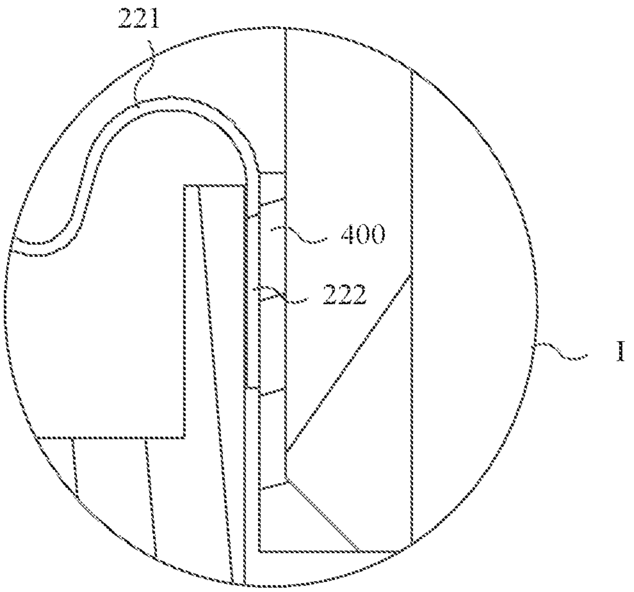
FIG. 10 is a locally enlarged diagram of I in FIG. 9.

FIG. 9 is a cutaway drawing of FIG. 8 along a line A-A, and FIG. 10 is a locally enlarged diagram of I in FIG. 9. Refer to FIG. 9 and FIG. 10. The speaker 20 in this embodiment of this application may further include a sealing layer 400. The sealing layer 400 is disposed between an outer sidewall of the speaker core 10 and the inner sidewall of the box 300. For example, the sealing layer 400 is disposed between a first connecting portion 222 of the speaker core 10 and the inner sidewall of the box 300, to seal the outer sidewall of the speaker core 10 and the inner sidewall of the box 300.

In this embodiment of this application, the sealing layer 400 is disposed between the outer sidewall of the speaker core 10 and the inner sidewall of the box 300, to prevent a sound in the speaker 20 from leaking from a bottom of the speaker 20, so as to ensure intensity of a sound propagated from a front of the speaker 20.

The sealing layer 400 may be a sealing ring sleeved on an outer side of the speaker core 10. In some examples, the sealing layer 400 may alternatively be sealant poured between the outer sidewall of the speaker core 10 and the inner sidewall of the box 300. A component of the sealant may include but is not limited to any one or more of natural resin, natural rubber, or synthetic rubber.

To facilitate filling of the sealant, a guide groove (not shown in the figure) may be disposed inwardly on the inner sidewall of the box 300, and the guide groove is located on a horizontal plane on which a top of the speaker core 10 is located. In this way, when the sealant is poured, the sealant may be introduced from one end of the guide groove to a position between the outer sidewall of the speaker core 10 and the inner sidewall of the box 300, to ensure a sealing effect between the outer sidewall of the speaker core 10 and the inner sidewall of the box 300.

An embodiment of this application further provides an electronic device, including the foregoing speaker 20.

In this embodiment of this application, the speaker 20 is disposed in the electronic device, to increase a sound pressure level of the speaker 20 in a full frequency band range, and avoid a case in which a nonlinear problem is aggravated due to an excessively small width of an arc-shaped portion 221 of a diaphragm folded ring 220 in the speaker 20, so as to ensure that increase of an amplitude of the speaker 20 is not inhibited and to increase a maximum value of the amplitude of the speaker 20.

It should be noted that the electronic device in this embodiment of this application may include but is not limited to a mobile or fixed terminal including the speaker 20, for example, a mobile phone, a tablet computer, a notebook computer, an ultra-mobile personal computer (ultra-mobile personal computer, UMPC for short), a handheld computer, an intercom, a netbook, a POS terminal, a personal digital assistant (personal digital assistant, PDA for short), a wearable device, or a virtual reality device.

In the descriptions of embodiments of this application, it should be noted that unless otherwise expressly specified and limited, terms “mount”, “connected”, and “connection” should be understood in a broad sense. For example, there may be a fixed connection, an indirect connection established by using an intermediate medium, an internal connection between two elements, or an interaction relationship between two elements. For a person of ordinary skill in the art, specific meanings of the terms in embodiments of this application may be understood based on a specific situation.

In the specification, claims, and accompanying drawings of embodiments of this application, the terms “first”, “second”, “third”, “fourth”, and the like (if existent) are intended to distinguish between similar objects but do not necessarily indicate a specific order or sequence.

What is claimed is:

1. A speaker core comprising:

a basin frame;

a diaphragm frame disposed on a top of the basin frame, wherein an inner sidewall of the diaphragm frame defines a vibration space; and a diaphragm comprising:

a diaphragm mass, wherein the diaphragm mass is located over a central region of the vibration space; and a diaphragm folded ring disposed around an outer edge of the diaphragm mass, wherein one end of the diaphragm folded ring is connected to an outer sidewall of the diaphragm frame, wherein the diaphragm folded ring comprises a circumferential arc-shaped portion, wherein the circumferential arc-shaped portion comprises a plurality of bent portions disposed in a radial direction, wherein two adjacent bent portions extend in opposite axial directions, and wherein at least one of the bent portions is suspended above the top of the diaphragm frame.

2. The speaker core of claim 1, wherein the bent portion of the circumferential arc-shaped portion that is suspended above the diaphragm frame extends in a direction distal from the diaphragm frame.

3. The speaker core of claim 1, wherein the circumferential arc-shaped portion of the diaphragm folded ring comprises a first bent portion and a second bent portion that are concentrically disposed in a radial direction relative to diaphragm, wherein the second bent portion is located between the first bent portion and the diaphragm mass, wherein the first bent portion extends in a direction distal from the diaphragm frame, wherein the second bent portion is extends in a direction towards the vibration space, and wherein the first bent portion is suspended above the top of the diaphragm frame.

4. The speaker core of claim 3, wherein bending radians of the first bent portion and the second bent portion are equal, and wherein widths of the first bent portion and the second bent portion are equal.

5. The speaker core of claim 1, wherein the diaphragm folded ring comprises:

a first connecting portion, wherein the first connecting portion is connected between an outer edge of the circumferential arc-shaped portion, and the outer sidewall of the diaphragm frame; and a second connecting portion, wherein the second connecting portion is connected between an inner edge of the circumferential arc-shaped portion and a surface of the diaphragm mass.

6. The speaker core of claim 5, wherein the first connecting portion is bonded to the outer sidewall of the diaphragm frame, and wherein the second connecting portion is bonded to the surface of the diaphragm mass.

7. The speaker core of claim 5, further comprising:

a buckle disposed on a surface of the first connecting portion adjacent to the outer sidewall of the diaphragm frame; and a clamping groove shaped to receive the buckle and positioned on the outer sidewall of the diaphragm frame, wherein the buckle is clamped in the clamping groove.

8. The speaker core of claim 7, wherein the buckle comprises a large end and a small end, and wherein the small end is connected to the first connecting portion.

9. The speaker core of claim 1, wherein the diaphragm frame further comprises a limiting portion, and wherein the limiting portion is configured to fit with a protruding portion on an inner wall of a box.

10. The speaker core of claim 9, wherein the limiting portion comprises at least a portion of a top surface of the diaphragm frame, and wherein the limiting portion abuts the protruding portion in an axial direction distal from the diaphragm.

11. The speaker core of claim 10, wherein a horizontal cross section of the basin frame comprises a quadrilateral structure comprising four corners at a top of the basin frame, and wherein a part of a top surface of each corner comprises the limiting portion.

12. The speaker core of claim 11, wherein a portion of the diaphragm folded ring comprises a planar surface, and wherein a portion of the planar surface abuts a surface of the limiting portion.

13. The speaker core of claim 1, wherein a width of the circumferential arc-shaped portion of the diaphragm folded ring is greater than or equal to 0.5 millimeters (mm) and less than or equal to 2.0 mm.

14. The speaker core of claim 1, wherein the diaphragm is clamped to the basin frame.

15. The speaker core of claim 1, wherein the diaphragm is affixed to the basin frame by an adhesive layer.

16. The speaker core of claim 1, wherein the diaphragm folded ring, the basin frame, and the diaphragm mass comprise an integral injection molded component.

17. A speaker comprising:
- a box; and
- a speaker core mounted in the box, wherein the speaker core comprises:
  - a basin frame;
  - a diaphragm frame disposed on a top of the basin frame, wherein an inner sidewall of the diaphragm frame defines a vibration space; and
  - a diaphragm covering a top of the diaphragm frame, wherein the diaphragm comprises:
    - a diaphragm mass located over a central region of the vibration space; and
    - a diaphragm folded ring disposed around an outer edge of the diaphragm mass, wherein one end of the diaphragm folded ring is connected to an outer sidewall of the diaphragm frame, wherein the diaphragm folded ring comprises a circumferential arc-shaped portion, wherein the circumferential arc-shaped portion comprises a plurality of bent portions disposed in a radial direction, wherein two adjacent bent portions extend in opposite axial directions, and wherein at least one bent portion is suspended above the top of the diaphragm frame.

18. The speaker of claim 17, further comprising:
- a protruding portion extending on an inner sidewall of the box; and
- a height limiting portion on a sidewall of the speaker core, wherein the height limiting portion fits with the protruding portion.

19. The speaker of claim 17, wherein the speaker further comprises a sealing layer disposed between an outer sidewall of the speaker core and the inner sidewall of the box.

20. An electronic device comprising:
- a speaker comprising:
  - a box; and
  - a speaker core mounted in the box, wherein the speaker core comprises:
    - a basin frame;
    - a diaphragm frame disposed on a top of the basin frame, wherein an inner sidewall of the diaphragm frame encloses a vibration space; and
    - a diaphragm comprising:
      - a diaphragm mass, wherein the diaphragm mass is located over a central region covering a top opening of the vibration space; and
      - a diaphragm folded ring disposed around an outer edge of the diaphragm mass, wherein one end of the diaphragm folded ring is connected to an outer sidewall of the diaphragm frame, wherein the diaphragm folded ring comprises a circumferential arc-shaped portion, wherein the circumferential arc-shaped portion comprises a plurality of bent portions, wherein the plurality of bent portions are disposed in a radial direction, wherein two adjacent bent portions are bent in opposite axial directions, and wherein a bent portion is suspended above the top of the diaphragm frame.

* * * * *